(12) United States Patent
Campbell et al.

(10) Patent No.: US 8,935,592 B2
(45) Date of Patent: Jan. 13, 2015

(54) APPARATUS AND METHOD FOR CORRECTING ERRORS IN DATA ACCESSED FROM A MEMORY DEVICE

(71) Applicant: ARM Limited, Cambridge (GB)

(72) Inventors: Michael Andrew Campbell, Cambridge (GB); Timothy Nicholas Hay, Cambridge (GB)

(73) Assignee: ARM Limited, Cambridge (GB)

( * ) Notice: Subject to any disclaimer, the term of this patent is extended or adjusted under 35 U.S.C. 154(b) by 81 days.

(21) Appl. No.: 13/681,789

(22) Filed: Nov. 20, 2012

(65) Prior Publication Data

US 2014/0143633 A1    May 22, 2014

(51) Int. Cl.
*G11C 29/00* (2006.01)
*G06F 11/10* (2006.01)

(52) U.S. Cl.
CPC ........................................ *G06F 11/10* (2013.01)
USPC ........................................ 714/764; 714/763

(58) Field of Classification Search
CPC ............ G11B 20/1833; G06F 11/1008; G06F 11/1076
USPC ................................................. 714/764, 763
See application file for complete search history.

(56) References Cited

U.S. PATENT DOCUMENTS

| | | | | |
|---|---|---|---|---|
| 4,335,458 A | * | 6/1982 | Krol | 714/763 |
| 5,359,468 A | * | 10/1994 | Rhodes et al. | 360/48 |
| 2008/0301529 A1 | | 12/2008 | Spanel et al. | |
| 2010/0107039 A1 | * | 4/2010 | Toda | 714/764 |
| 2010/0122146 A1 | | 5/2010 | Nazarian et al. | |
| 2011/0041016 A1 | | 2/2011 | O'Connell | |

FOREIGN PATENT DOCUMENTS

EP    0 494 547    7/1992

OTHER PUBLICATIONS

GB Search Report dated Apr. 11, 2014 in GB 1319011.1.

* cited by examiner

*Primary Examiner* — Fritz Alphonse
(74) *Attorney, Agent, or Firm* — Nixon & Vanderhye P.C.

(57) ABSTRACT

An apparatus and method for correcting errors in data accessed from a memory device. A plurality of read symbols are read from a memory device. Syndrome information is then determined from the n data symbols and associated m error correction code symbols. Error correction circuitry uses the syndrome information in order to attempt to locate each read symbol containing an error and to correct the errors in each of those located read symbols. Error tracking circuitry tracks which memory regions the located read symbols containing an error originate from, and, on detecting an error threshold condition, sets at least one memory region as an erasure memory region. The correction circuitry treats each read symbol as a located read symbol containing an error, such that the read symbols to be located are not all randomly distributed and more than PMAX read symbols containing errors can be corrected.

21 Claims, 9 Drawing Sheets

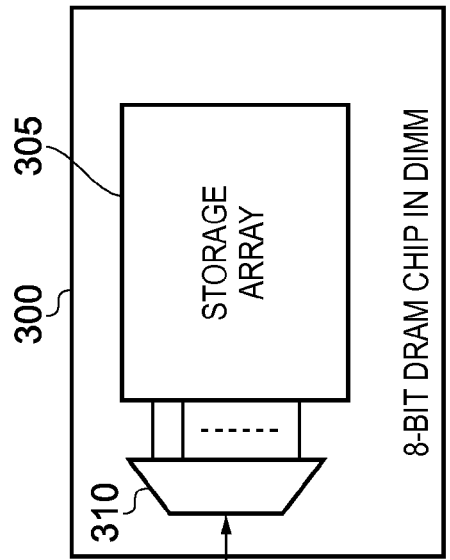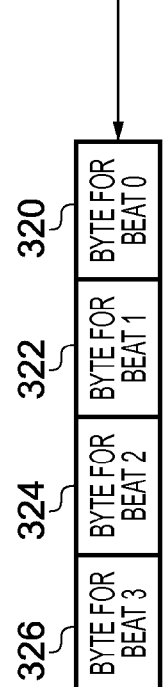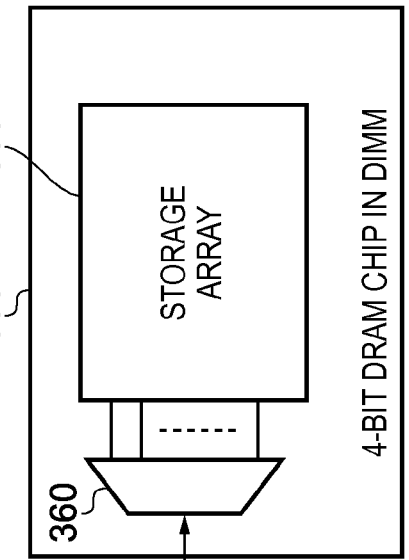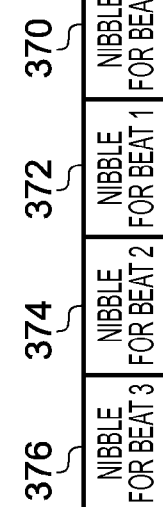
FIG. 4A
FIG. 4B

APPARATUS AND METHOD FOR CORRECTING ERRORS IN DATA ACCESSED FROM A MEMORY DEVICE

BACKGROUND OF THE INVENTION

1. Field of the Invention

The present invention relates to an apparatus and method for correcting errors in data accessed from a memory device.

2. Description of the Prior Art

It is known to use error correction codes (ECC) in order to protect a data packet from various forms of data corruption. Typically, this is achieved by treating the data packet as a series of data symbols of fixed length, and then adding a number of ECC symbols so that the data symbols and ECC symbols collectively form a code word. Using such a technique, if m ECC symbols are added when forming the code word, then up to m/2 randomly located symbol errors can be located and corrected within the code word. There are various known ECC coding techniques for generating the symbols of the code word. For example, one technique uses Reed Solomon codes, these codes being based on Galois field mathematics and having properties which make them suitable for hardware implementation.

One practical application for such an ECC coding technique is in memory devices, for example memory devices using DRAM (Dynamic Random Access Memory). One known arrangement of such a memory device involves providing a number of Dual Inline Memory Modules (DIMMs), where each DIMM consists of a number of DRAM chips on a circuit board, including at least one chip reserved for storing ECC information. Often, such a memory device is accessed via burst access operations, each burst comprising a plurality of beats, and the DRAM chips of the DIMM being accessed during each beat. In such an arrangement, it is known to treat the entirety of the data to be written to the memory device via a burst write access as forming the data packet, with a plurality of ECC codes then being generated to add to that data packet in order to form the code word. As mentioned earlier, if the code word includes m ECC symbols, then up to m/2 randomly located symbol errors can be corrected when the data is subsequently read from the memory via a burst read access.

Considering as a specific example a DIMM consisting of nine 8-bit DRAM chips (meaning that eight bits of data can be accessed from each DRAM chip per beat of the burst access operation), then a 72-bit DRAM interface can be provided to enable each of the nine DRAM chips to be accessed every beat. If one of the chips is reserved for storing ECC symbols, then eight bits of ECC data can be accessed per beat. If it is also assumed in this example that each symbol comprises eight bits, then it will be seen that during an example eight beat read operation, 64 data symbols and 8 ECC symbols will be accessed. Using the above mentioned property, this will mean that up to four randomly located symbols can be in error and still be corrected.

However, it is often the case that the number of beats in the burst exceeds m/2. For example, in the above particular example of an eight beat read operation, there were eight ECC symbols (i.e. m=8) read, but there were also eight beats. Further, it has been found that errors tend to accumulate in a single chip on a DIMM, and if a particular chip within the DIMM fails, then it is likely that all of the symbols accessed from that chip during a particular burst read operation will be in error. In such a situation, the error correcting capabilities of the ECC scheme will have been exceeded.

One known way to seek to provide resilience against an entire chip failure is to provide a finer granularity of chips within the DIMM. For example, considering the earlier mentioned example of a DIMM comprising nine 8-bit DRAM chips, an equivalent DIMM could also be provided by eighteen 4-bit DRAM chips (where each DRAM chip hence provided four bits (also referred to as a nibble) of data per beat). If each symbol now comprises 4-bits, it will be seen that two of the 4-bit DRAM chips can be used to store ECC symbols, hence giving rise to sixteen 4-bit ECC symbols within the code word formed by the entire eight beat burst transfer. This then enables eight 4-bit randomly located symbol errors to be detected and corrected, hence allowing a single 4-bit chip failure (where all eight of the accesses to that chip output symbols with errors). The problem with this approach is that it requires more chips and a smaller symbol size. One implication of a smaller symbol size is that it can restrict the coding of the Galois field, and hence the code word formation. For example, in Reed Solomon codes the maximum code word is $2^{symbol\,size}$.

Another known approach is to effectively double the size of the burst transfer, and access two DIMMs in parallel. Considering the earlier example where each DIMM consisted of nine 8-bit DRAM chips, such an approach this would yield a 144-bit DRAM interface that included two ECC symbols (where the symbol size is 8 bits) per beat. With this configuration, it is apparent that the ECC scheme can be used to protect against a single 8-bit chip failure appearing in one of the two DIMMs, again assuming a burst transfer of eight beats. Alternatively, if each DIMM included 4-bit chips, such an approach could protect against two 4-bit chip failures occurring, since the use of 4-bit chips produces four ECC symbols per beat, or 32 ECC symbols in total (assuming a burst transfer of eight beats), allowing sixteen random symbol failures, equivalent to two symbols per beat. The disadvantage of such an approach is that it requires data to be spread across multiple DIMMs, hence requiring additional memory resource and also increasing the minimum memory access requirements. Further, it assumes that the Mean Time to Board Failure (MTBF) will differ between the two DIMMs since otherwise if a chip failure was likely to occur at the same time in both DIMMs such an approach would provide no benefit.

Accordingly, it would be desirable to provide an improved mechanism for increasing resilience to failure within a region of a memory device.

SUMMARY OF THE INVENTION

Viewed from a first aspect, the present invention provides an apparatus comprising: a memory device comprising multiple memory regions, and configured to store data symbols and associated error correction code (ECC) symbols; read circuitry configured to perform a read operation in order to output a plurality of read symbols from said memory device, said read symbols comprising n data symbols and an associated m error correction code symbols, and comprising more than one read symbol from each memory region, both n and m being integer values greater than 1; a syndrome decoder configured to determine syndrome information from the n data symbols and associated m error correction code symbols; error correction circuitry configured to be responsive to said syndrome information indicating that an error exists in at least one read symbol, to perform an error correction process to seek to locate each read symbol containing an error and to correct the errors in each of those located read symbols, if the read symbols containing an error are randomly distributed amongst the plurality of read symbols, the error correction circuitry being configured to locate and correct those errors using the error correction process if no more than PMAX read symbols of said plurality of read symbols contain errors; and error tracking circuitry configured to track which memory regions the located read symbols containing an error originate from, and on detecting an error threshold condition being reached, to set at least one memory region from said multiple memory regions as an erasure memory region; the error correction circuitry being responsive to the erasure memory region being set by the error tracking circuitry, to treat each read symbol from said erasure memory region as a located read symbol containing an error, such that when the error correction process is performed the read symbols to be located are not all randomly distributed and the error correction circuitry is configured to locate and correct the errors if no more than x read symbols of said plurality of read symbols contain errors, where x is greater than PMAX.

In accordance with the present invention, error tracking circuitry tracks where within the memory device the read symbols containing errors are located, and in particular which of the multiple memory regions those read symbols originate from. If an error threshold condition is reached, at least one of the memory regions is set as an erasure memory region. Once the erasure memory region has been set, this affects how the error correction process uses the syndrome information to seek to locate read symbols containing an error. In particular, all read symbols from the erasure memory region are treated as containing an error, meaning that the distribution of read symbols containing errors is no longer treated as being entirely random. This allows the number of read symbols containing errors to increase, whilst still enabling the error correction process to identify and correct those errors.

By treating at least one memory region as an erasure memory region once an error threshold condition has been detected, this hence extends the correction capability of the error correction circuitry having regard to the given number m of ECC symbols within the read symbols.

In one embodiment, if the total number of read symbols from the erasure memory region is q, then the error correction circuitry is configured to correct errors in all q read symbols from said erasure memory region and in addition to correct errors in up to p read symbols from any memory regions not set as said erasure memory region, where: $p=(m-q)/2$, where m is greater than or equal to q, and p and q are integer values greater than or equal to 0.

Hence, in the absence of the erasure memory region being set, it will be appreciated that q=0, and the maximum number of errors that can be located and corrected, namely PMAX, is m/2. Similarly, the maximum number of read symbols that may be located and corrected, within the erasure memory region, referred to herein as QMAX, is m, and in this instance it will be understood that p is 0, i.e. all m of the read symbols within the erasure memory region will be located and corrected, but no additional read symbols from any memory regions not set as said erasure memory region can be corrected. Effectively, once the erasure memory region has been set, then up to m read symbols from within that erasure memory region can be located and corrected, which is twice as many read symbols as is the case when it is assumed that the read symbols containing errors are randomly distributed. This can be particularly beneficial if errors are likely to accumulate within one or a few memory regions. For example, considering the earlier mentioned example of a DIMM comprising multiple DRAM chips, each chip can form a memory region, and the above approach enables at least one of the chips to be marked as the erasure memory region, this increasing the likelihood that the error correction process can correct errors due to a failure of that chip.

For example, in one embodiment the plurality of read symbols output by the read circuitry during the read operation may comprise more than PMAX read symbols from each memory region. Accordingly, without setting an erasure memory region, it is not possible to locate and correct a situation where every read symbol from a particular failing memory region is in error. However, if that failing memory region is set as an erasure memory region, then this increases the number of errors which can be corrected. In particular, provided that the failing memory region does not contain more than m read symbols, then all of the read symbols from that memory region can be corrected.

In one embodiment, the read operation is a burst read operation comprising multiple beats, and each memory region is accessed during every beat.

In one embodiment there are at least as many error correction code symbols in said plurality of read symbols as there are beats in the burst read operation. In one particular embodiment, there are m beats in the burst read operation, i.e. there are the same number of error correction code symbols as there are beats in the burst read operation. Accordingly, in that embodiment, if the data read from each memory region every beat, forms a read symbol, then every read symbol from one of the memory regions can be corrected once that memory region has been set as the erasure memory region. Similarly, if the data read from one memory region over two consecutive beats forms a read symbol, then all of the read symbols from up to two memory regions can be corrected once those two memory regions have been set as the erasure memory region.

In one embodiment the memory device comprises a plurality of memory chips, each memory chip forming one of the memory regions. In one particular embodiment, the memory device comprises a dual inline memory module (DIMM), each memory chip has an associated data lane, and the read operation is a burst read operation comprising multiple beats, during each beat at least one data unit being read from each memory chip via its associated data lane.

The data unit read from each memory chip can take a variety of forms. In one embodiment, that data unit is a byte (i.e. 8 bits) of data, whilst in another embodiment that data unit is a nibble (i.e. 4 bits) of data.

In one particular embodiment, during each beat a byte is output from each memory chip, and each read symbol comprises one of said bytes. In such an embodiment, every read symbol from a single failing memory chip can be corrected once that memory chip has been identified as the erasure memory region.

In an alternative embodiment, during each beat a nibble is output from each memory chip, and each read symbol is formed from two nibbles output over the same data lane in consecutive beats. In such an embodiment, every read symbol from up to two failing memory chips can be corrected once those two memory chips have been identified as the erasure memory region. Alternatively, one failing chip may be identified as the erasure memory region, allowing all of the read symbols from that memory chip to be corrected, and in addition a number of randomly distributed errors can also be corrected.

The read symbols can take a variety of forms, but in one embodiment the read symbols form a Reed Solomon code word.

There are a number of ways in which the error tracking circuitry can be configured to determine whether the error threshold condition has arisen. In one embodiment, the error tracking circuitry is configured to determine whether the error threshold condition is detected based on at least an indication of which memory regions the located read symbols containing an error originate from for a current read operation. As a particular example, if it is determined that in a current read operation PMAX randomly distributed errors have arisen, but a number of those errors (which may be all, or less than all, of those errors) are associated with a particular memory region, then this pattern of errors may cause the error threshold condition to be detected, and hence cause that particular memory region to be marked as an erasure memory region.

In one embodiment, the error tracking circuitry additionally maintains a history of which memory regions the located read symbols containing an error originate from for a number of previous read operations, and also references that history when determining whether the error threshold condition is detected. Hence, by way of example, the error tracking circuitry may be arranged to not set the erasure memory region the first time the above-mentioned pattern of errors is detected, but to only do so after that pattern of errors has been detected for a number of read operations. A balance has to be struck here between not wishing to set the erasure memory region too early, but also setting it before a situation arises where more than PMAX randomly distributed errors have arisen, since if there are more than PMAX errors, and the erasure memory region has not set, the error correction circuitry will typically not be able to locate and correct those errors.

In one embodiment, once the erasure memory region has been set, the error tracking circuitry is configured to maintain the set erasure memory region until a reset operation is performed. Alternatively, the error tracking circuitry could be configured to maintain a record of how many of the read symbols from the erasure memory region are actually giving rise to errors over time, and if that number starts to decrease below the number that caused the erasure memory region to be set (for example because the errors turned out in practice not to be indicative of a failing chip, but merely were transient errors that have now disappeared), then the error tracking circuitry may be arranged to clear the erasure memory region, allowing it to be reset again in due course.

The error correction process can take a variety of forms. In one embodiment, the error correction process performed by the error correction circuitry comprises: a) seeking to solve an error location polynomial using the syndrome information as an input; b) if the error location polynomial is solved at said step (a), identifying each read symbol containing an error by determining roots of the solved error location polynomial; and c) using the roots and the syndrome information to determine the corrected values for the read symbols identified at said step (b).

In one embodiment, the error location polynomial has a plurality of parameters which can be varied during said step (a) when seeking to solve the error location polynomial, and if the erasure memory region is set, the error correction circuitry is configured to fix values for at least a subset of the plurality of parameters, the fixed values being dependent on the at least one memory region set as the erasure memory region.

If the memory erasure region has not been set, and at said step (a) the error location polynomial cannot be solved, then it will in one embodiment be concluded that the number of errors exceeds PMAX, and that those errors accordingly cannot be located and corrected.

Viewed from a second aspect, the present invention provides a method of correcting errors in data accessed from a memory device comprising multiple memory regions and configured to store data symbols and associated error correction code (ECC) symbols, the method comprising: performing a read operation in order to output a plurality of read symbols from said memory device, said read symbols comprising n data symbols and an associated m error correction code symbols, and comprising more than one read symbol from each memory region, both n and m being integer values greater than 1; determining syndrome information from the n data symbols and associated m error correction code symbols; responsive to said syndrome information indicating that an error exists in at least one read symbol, performing an error correction process to seek to locate each read symbol containing an error and to correct the errors in each of those located read symbols, if the read symbols containing an error are randomly distributed amongst the plurality of read symbols, the error correction process locating and correcting those errors if no more than PMAX read symbols of said plurality of read symbols contain errors; tracking which memory regions the located read symbols containing an error originate from, and on detecting an error threshold condition being reached, setting at least one memory region from said multiple memory regions as an erasure memory region; and responsive to the erasure memory region being set by the error tracking circuitry, treating each read symbol from said erasure memory region as a located read symbol containing an error, such that when the error correction process is subsequently performed the read symbols to be located are not all randomly distributed and the error correction process locates and corrects the errors if no more than x read symbols of said plurality of read symbols contain errors, where x is greater than PMAX.

Viewed from a third aspect, the present invention provides an apparatus comprising: memory means for storing data symbols and associated error correction code (ECC) symbols, the memory means comprising multiple memory regions; read means for performing a read operation in order to output a plurality of read symbols from said memory means, said read symbols comprising n data symbols and an associated m error correction code symbols, and comprising more than one read symbol from each memory region, both n and m being integer values greater than 1; a syndrome decoder means for determining syndrome information from the n data symbols and associated m error correction code symbols; error correction means, responsive to said syndrome information indicating that an error exists in at least one read symbol, for performing an error correction process to seek to locate each read symbol containing an error and to correct the errors in each of those located read symbols, if the read symbols containing an error are randomly distributed amongst the plurality of read symbols, the error correction means locating and correcting those errors using the error correction process if no more than PMAX read symbols of said plurality of read symbols contain errors; and error tracking means for tracking which memory regions the located read symbols containing an error originate from, and on detecting an error threshold condition being reached, for setting at least one memory region from said multiple memory regions as an erasure memory region; the error correction means, responsive to the erasure memory region being set by the error tracking means, for treating each read symbol from said erasure memory region as a located read symbol containing an error, such that when the error correction process is performed the read symbols to be located are not all randomly distributed and the error correction means locates and corrects the errors if no more than x read symbols of said plurality of read symbols contain errors, where x is greater than PMAX.

BRIEF DESCRIPTION OF THE DRAWINGS

The present invention will be described further, by way of example only, with reference to embodiments thereof as illustrated in the accompanying drawings, in which:

FIGS. 4A and 4B illustrate two example arrangements of chips that may be used within the DIMM of FIG. 1 in accordance with one embodiment, along with the associated data units accessed during each beat;

DESCRIPTION OF EMBODIMENTS

Figure 1:
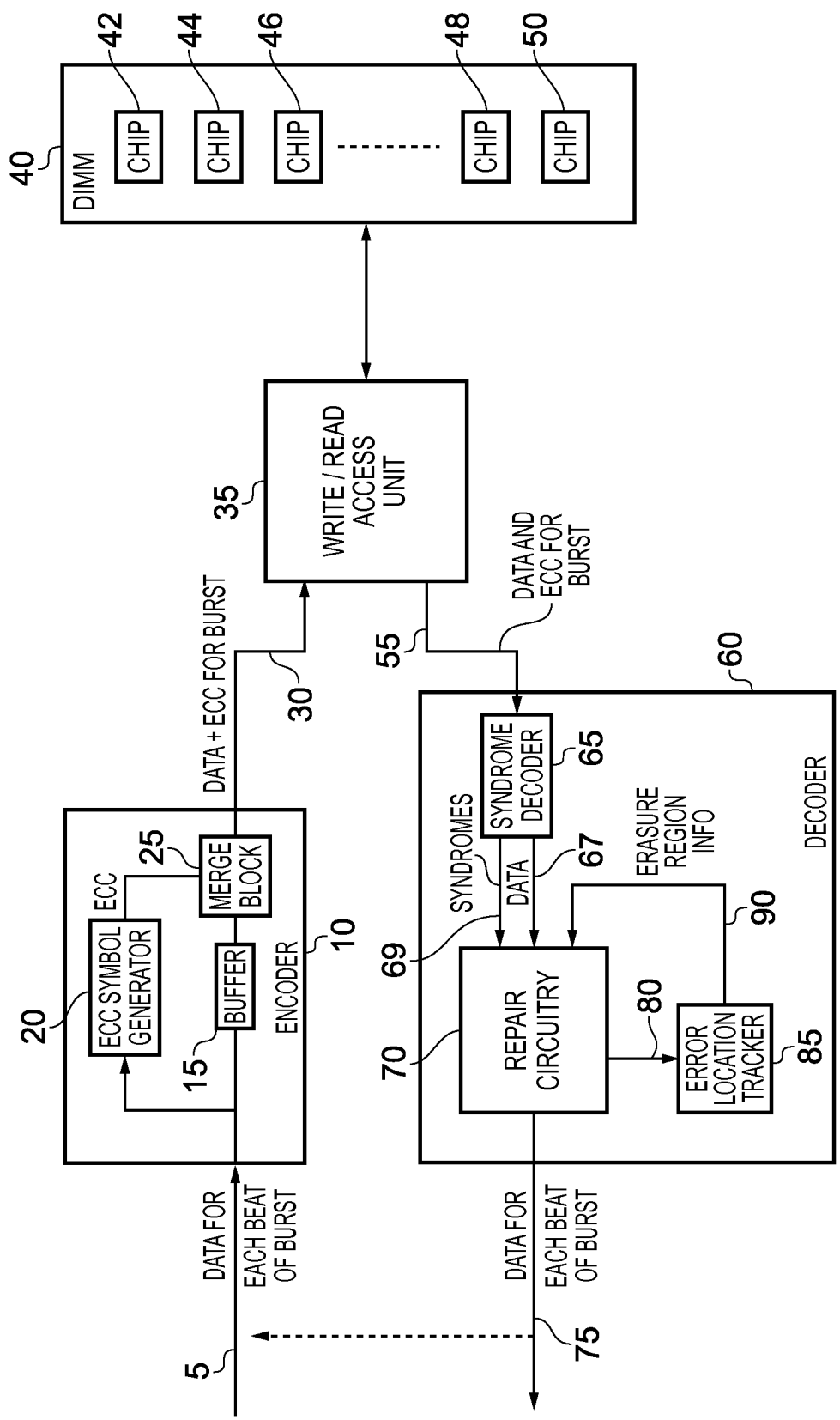
FIG. 1 is a block diagram of an apparatus in accordance with one embodiment.

FIG. 1 is a block diagram of an apparatus in accordance with one embodiment. In this embodiment, a DIMM 40 consists of a plurality of DRAM chips 42, 44, 46, 48, 50, and both write and read accesses to the DIMM 40 are performed as burst accesses comprising multiple beats. The write/read access unit 35 is used to access the DIMM 40 during each beat of a burst access. Typically, for a burst write operation, data will be written into each of the chips 42, 44, 46, 48, 50 during each beat, and similarly during a burst read operation, data will be read from each of the chips during each beat.

The encoder 10 is used to generate ECC symbols to be associated with the data of a burst write operation. For each beat, the data provided over path 5 for that beat is stored within the buffer 15, but in addition is provided to the ECC symbol generator 20. The ECC symbol generator 20 will generate a predetermined number of ECC symbols based on the received data for the first beat. Thereafter, as the data for each subsequent beat is received and stored within the buffer 15, that data will also be provided to the ECC symbol generator 20, causing it to update the predetermined number of ECC symbols having regard to the latest data received. By the time the data for all of the beats of the burst write operation have been received and buffered, the predetermined number of symbols generated by the ECC symbol generator 20 will then be ECC symbols that are associated with the entire data of the burst write operation.

The predetermined number of ECC symbols produced by the ECC symbol generator will be dependent on the particular implementation. However, in one embodiment, the number of ECC symbols generated is the same as the number of beats in the burst write access. Hence, considering a particular example where the burst write access contains eight beats, then the ECC symbol generator 20 will generate eight ECC symbols.

In one particular embodiment, the encoder 10 generates a Reed Solomon code word based on the received write data of the burst, encoding that write data using n data symbols (containing the write data) and an associated m ECC symbols. The operation of the ECC symbol generator to generate the ECC symbols to be associated with the write data will be well understood by those skilled in the art, and accordingly will not be discussed further herein.

Once the ECC symbols have been generated by the ECC symbol generator 20, they are provided to the merge block 25 along with the data from the buffer 15, the merge block producing a sequence of symbols containing both the data symbols and the ECC symbols, which are provided over path 30 to the write/read access unit 35. From there, the various symbols are written into corresponding chips within the DIMM 40. In particular, each chip will have a data lane associated therewith over which data is written into the chip, and read from the chip. The corresponding data from each beat will typically be written to the same chip over the associated data lane. At least one of the chips will typically be reserved for the storing of ECC symbols.

Having written the data into the DIMM 40 using a burst write access as discussed above, data will also be read from the DIMM via burst read accesses. In particular, when a burst read operation is performed, the data for each beat will be read by the write/read access unit 35 and forwarded to the decoder 60. Typically, each chip will be accessed during every beat, and will provide a data unit (for example a byte or a nibble of data) over its associated data lane to the write/read access unit 35, from where that data will be passed over path 55 to the decoder 60.

The read data is initially passed to syndrome decoder 65, which is arranged to determine syndrome information from the data symbols and associated ECC symbols. The syndrome decoder generates syndrome information by analysing all of the read symbols (both the data symbols and the ECC symbols) associated with the burst read access. In particular, the syndrome decoder divides those read symbols by the generator polynomial used to create the ECC symbols within the encoder 10. If the result is zero, then no errors have been detected, and the data output over path 67 can be propagated out over path 75 from the repair circuitry 70 without any modification. However, if the result is non-zero, then the resultant syndrome information is sent over path 69 along with the data over path 67, for use by the repair circuitry 70 in seeking to locate and correct any read symbols containing errors.

The operation of the repair circuitry 70 will be discussed in more detail later, but in essence the repair circuitry 70 seeks to solve an error location polynomial using the syndrome information as an input. If the error location polynomial is solved, then each read symbol containing an error is identified by determining the roots of the solved error location polynomial. The identified roots and the syndrome information can then be used to determine the corrected values of the read symbols that have been identified as being in error.

Initially, the repair circuitry has to assume that the read symbols containing errors are randomly distributed amongst the plurality of read symbols of the burst read access. Assuming there are m ECC symbols read from the DIMM 40 during the burst read operation, the repair circuitry will be able to solve the error location polynomial provide there are no more than m/2 symbols in error.

The error location tracker 85 receives information over path 80 as to the locations of symbols identified by the repair circuitry as containing errors. In particular, the error location tracker 85 monitors which of the chips 42, 44, 46, 48, 50 have output symbols with an error. If the pattern of the errors indicates that an error threshold condition has been reached, then the error location tracker 85 sets at least one of the chips as being an erasure memory region, and that erasure memory region information is output over path 90 to the repair circuitry for use during a subsequent burst read operation. In particular, once a chip has been set as an erasure memory region, then the repair region will subsequently treat each read symbol from that chip as a located read symbol containing an error. Accordingly, the distribution of read symbols containing errors is no longer treated as being entirely random, and this allows the number of read symbols containing errors to increase, whilst still enabling the error correction process performed by the repair circuitry 70 to identify and correct those errors. At a maximum, such an approach allows the repair circuitry to locate and correct up to m symbols containing errors (i.e. to correct the same number of symbols as there are ECC symbols in the burst read operation), provided all of those symbols reside within a particular chip (or chips) set as the erasure memory region.

Figure 2:
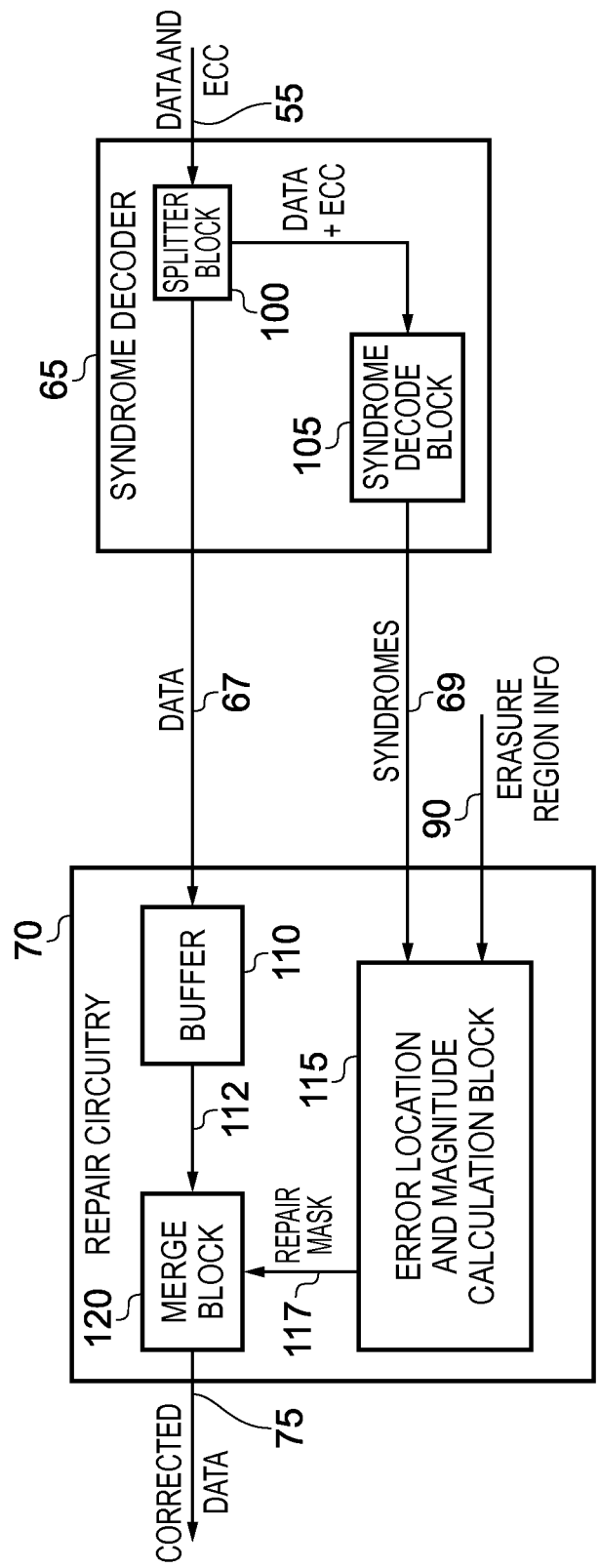
FIG. 2 is a block diagram illustrating in more detail components provided within the syndrome decoder and repair circuitry of FIG. 1 in accordance with one embodiment.

FIG. 2 illustrates in more detail components provided within the syndrome decoder 65 and the repair circuitry 70 in accordance with one embodiment. The syndrome decoder 65 includes a splitter block 100 which passes the data symbols over path 67 to the buffer 110 within the repair circuitry 70, but also routes both the data and the associated ECC symbols to the syndrome decode block 105, which is used to generate the syndrome information output over path 69. If the syndrome information is non-zero, this will cause the error location and magnitude calculation block 115 within the repair circuitry 70 to perform the earlier discussed process of seeking to solve the error location polynomial and, once solved, to then determine the roots of the solved error location polynomial in order to identify each read symbol containing an error. In addition, the error location and magnitude calculation block 115 will determine the corrected values for the located read symbols, and output that information as a repair mask over path 117. The repair mask is a vector that is the same size as the data of the read access stored within the buffer 110. This vector contains non-zero values in locations that correspond to errors, whilst all other locations contain zeros. The merge block 120 then receives both the repair mask over path 117 and the data from the buffer 110 over path 112 and corrects the errors in the received data by adding the received data to the repair mask using a Galois field adder (implementing an XOR function). This results in the generation of corrected data output over path 75.

Figure 3:
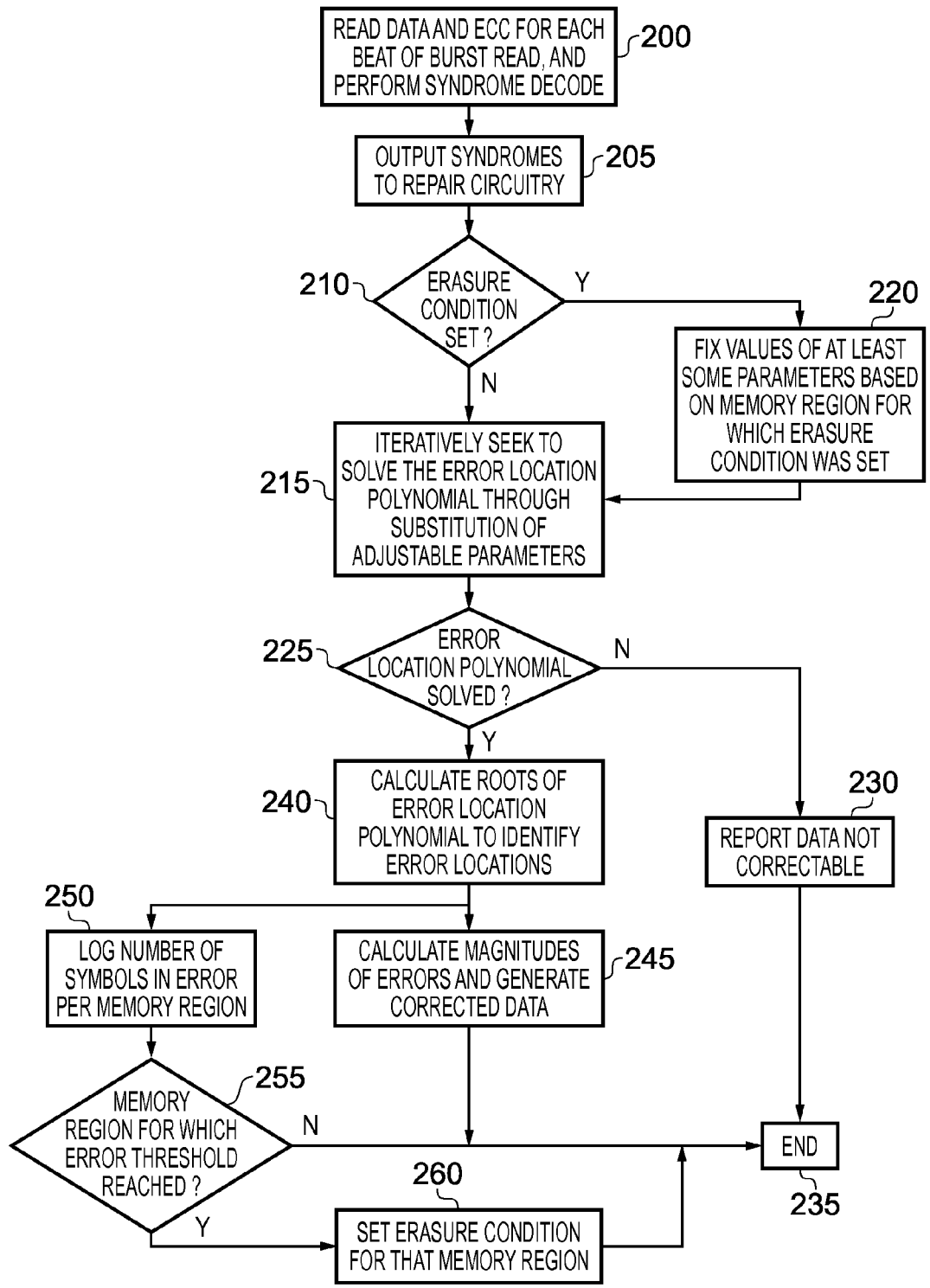
FIG. 3 is a flow diagram illustrating the steps performed by the apparatus of FIG. 1 when performing a burst read operation in accordance with one embodiment.

FIG. 3 is a flow diagram illustrating steps performed by the apparatus of FIG. 1 when performing a burst read operation in accordance with one embodiment. Firstly, at step 200, the data symbols and associated ECC symbols for each beat of the burst read operation are read, and provided to the syndrome decoder 65 to enable the syndrome decoder to determine the syndrome information. Thereafter, at step 205, the syndrome information is output to the repair circuitry 70. At step 210, the repair circuitry 70 determines whether the erasure condition has been set, i.e. whether the error location tracker has provided any set erasure memory region information over path 90. If not, then the process proceeds to step 215, where the repair circuitry iteratively seeks to solve the error location polynomial through substitution of adjustable parameters.

There are a number of ways in which the error location polynomial can be solved. One known approach is to use the Berlekamp-Massey algorithm, this algorithm being commonly used due to its efficient use of hardware resource (compared to Euclid's algorithm for example). This algorithm iteratively seeks to solve the error location polynomial by solving one equation after another and updating the error location polynomial. If it cannot solve the equation for a given step, it computes the error and weighs it, increases the size of the error polynomial and performs another iteration. Assuming m ECC symbols are provided, a maximum of m iterations are required. For z symbol errors, the algorithm gives a polynomial with z coefficients. However, in the absence of the erasure condition being set, if z is greater than m/2, the error location polynomial will not be solved, and the data will be non-correctable.

Accordingly, at step 225, it is determined whether the error location polynomial is solved, and if not the process proceeds to step 230 where the data is marked as non-correctable, whereafter the process ends at step 235.

However, assuming the error location polynomial is solved, then the process proceeds to step 240 where the roots of the error location polynomial are calculated in order to identify the locations of the symbols containing errors. The most commonly used method for solving the roots is the Chien Search (CS). This is an exhaustive search through possible symbols, each being substituted into the error polynomial one by one. If the result is zero, then the candidate symbol is a root.

Following step 240, the process proceeds to step 245, where the magnitudes of the errors are calculated, and the corrected data thereafter generated. The roots calculated at step 240 define the location of the symbols containing errors but not the magnitude of the errors. The roots can be used with the syndromes to derive the actual error values. This may be done for example using a Forney algorithm.

Once the Forney algorithm has been applied, this results in the generation of an error vector, also referred to herein as the repair mask. The error vector contains non-zero values in locations that correspond to errors, whilst all other locations contains zeros. As described earlier with reference to FIG. 2, the merge block 120 combines the received data from the buffer 110 with the error vector using a Galois field adder (implemented using an XOR function), with the output from the Galois field adder being the decoder's estimate of the original code word (i.e. the original data written into the DIMM 40). Following step 245, the process ends at step 235.

In accordance with the above-described embodiment of FIG. 1, the error location tracker 85 performs step 250 in parallel with step 245 performed by the repair circuitry 70. At step 250, the error location tracker 85 logs the number of symbols in error per memory region (i.e. per chip in the embodiments of FIG. 1 where each chip forms a separate memory region), and then at step 255 determines whether the erasure threshold condition has been reached indicating at least one memory region which should be set as an erasure memory region. Discussion of possible error threshold conditions will be provided later with reference to FIGS. 5A, 5B, 6A, 6B and 6C. If the error threshold condition is detected, then the process proceeds to step 260 where the erasure condition is set for the identified memory region, whereafter the process ends at step 235. However, if at step 255 it is determined that the error threshold condition has not been detected, then the process proceeds directly to step 235.

Once the erasure condition has been set, then for a subsequent burst read operation, at step 210 the setting of that erasure condition will be detected, and the process will branch to step 220. At step 220 values of at least some of the adjustable parameters for the error location polynomial will be fixed, based on the memory region (or memory regions) for which the erasure condition was set. In particular, all of the read symbols from the erasure memory region are treated as located read symbols containing an error, and will be referred to herein as erasure locations. Those erasure locations are captured as an erasure location polynomial (where the erasure locations form the roots of that polynomial). This erasure location polynomial is then loaded into the Berlekamp-Massey location polynomial storage at the start of the repair process. The process then proceeds to step 215.

Having proceeded to step 215 via step 220, this increases the likelihood that the error location polynomial will be solved, since certain of the parameters will have their values fixed. In addition, it may be possible to perform some of the iterations in parallel rather than sequentially at this point, due to the fixed values that have been set at step 220.

It will be appreciated that once the erasure condition is set, then it is no longer the case that all of the symbol errors are randomly located. If the number of randomly located errors is denoted by the variable p, and the number of known location symbol errors (i.e. the symbols within the erasure memory region) is denoted by the variable q, then having provided m ECC symbols, the relationship between m, p and q is as follows:

$$m=2p+q.$$

Accordingly, it will be understood that when the erasure memory region has not been set, then q=0 and the maximum number of errors that can be corrected, namely p, is m/2. However, as soon as the erasure memory region has been set, the total number of errors that can be corrected increases. The maximum number of errors that can be corrected occurs when the erasure memory region contains m read symbols, i.e. q=m. In this instance, all m of those symbols can be corrected, but no randomly located errors can be corrected, i.e. p=0.

The chips 42, 44, 46, 48, 50 within the DIMM 40 can take a variety of forms. FIG. 4A illustrates one example, where each chip 300 is an 8-bit DRAM chip, meaning that the data accessed over the associated byte lane 315 during every beat of a burst access operation comprises eight bits (i.e. a byte) of data. The data will be stored in a storage array 305 and accessed via a multiplexing arrangement 310 in order to allow eight bits of data to be written into the storage array each beat of a burst write transfer, or to allow eight bits of data to be read out from the storage array 305 during every beat of a burst read operation. Hence a series of bytes 320, 322, 324, 326 can be stored into the chip 300 via the byte lane 315 during the beats of a burst write operation, and the corresponding data can subsequently be read during beats of a burst read operation.

FIG. 4B illustrates a similar arrangement, but in this example the chip 350 is a 4-bit DRAM chip having a storage array 355 and associated multiplexer 360. During each beat of a burst access, a 4-bit chunk of data (referred to as a nibble) can be input or output over the associated nibble lane 365, and hence as schematically illustrated by the nibbles 370, 372, 374, 376, a nibble can be written during each beat of a burst write operation, or read during each beat of a burst read operation.

Figure 5A:
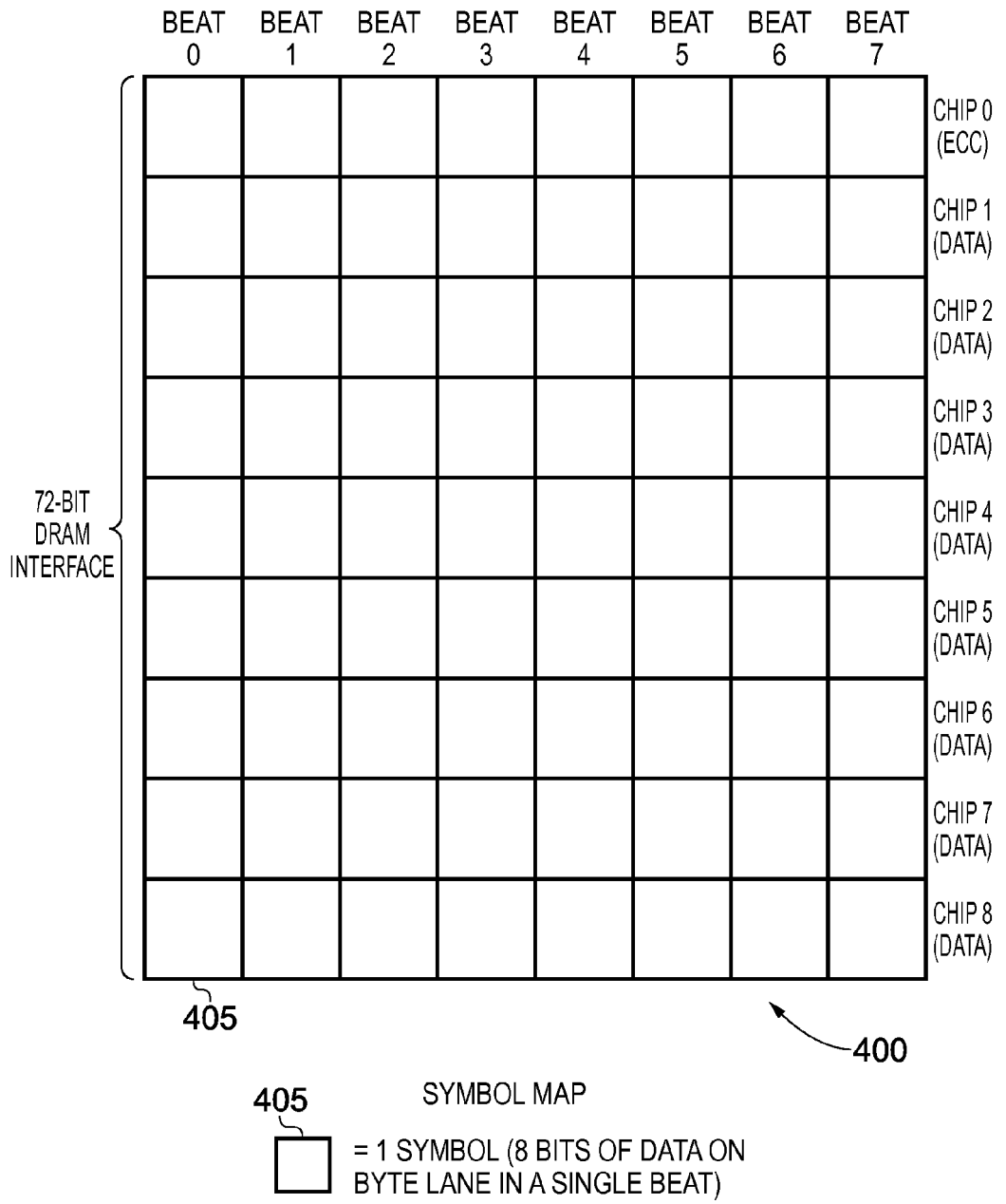
FIG. 5A illustrates a symbol map in accordance with one embodiment, whilst

FIG. 5A illustrates a symbol map 400 that may be used in accordance with one embodiment. In this embodiment, it is assumed that the DIMM contains nine 8-bit DRAM chips 300, chips 1 to 8 being used to store data, and chip 0 being used to store ECC codes. These nine 8-bit DRAM chips hence provide the DIMM with a 72-bit DRAM interface. In this example, it is assumed that burst accesses are 8-beat burst accesses, and accordingly during each beat a byte of data will be accessed in each chip. In this example, it is also assumed that each symbol is formed by the unit of data accessed from each chip in a single beat, and accordingly each of the squares 405 represents a symbol. Hence, in this example, during a burst read operation it will be seen that 64 bytes of data will be accessed, along with 8 bytes of ECC codes (formed as eight ECC symbols). As will be apparent from the earlier discussions, if the symbols containing errors are assumed to be randomly distributed within the symbol map 400, then the maximum number of symbols that can be corrected using the eight ECC symbols is four.

Figure 5B:
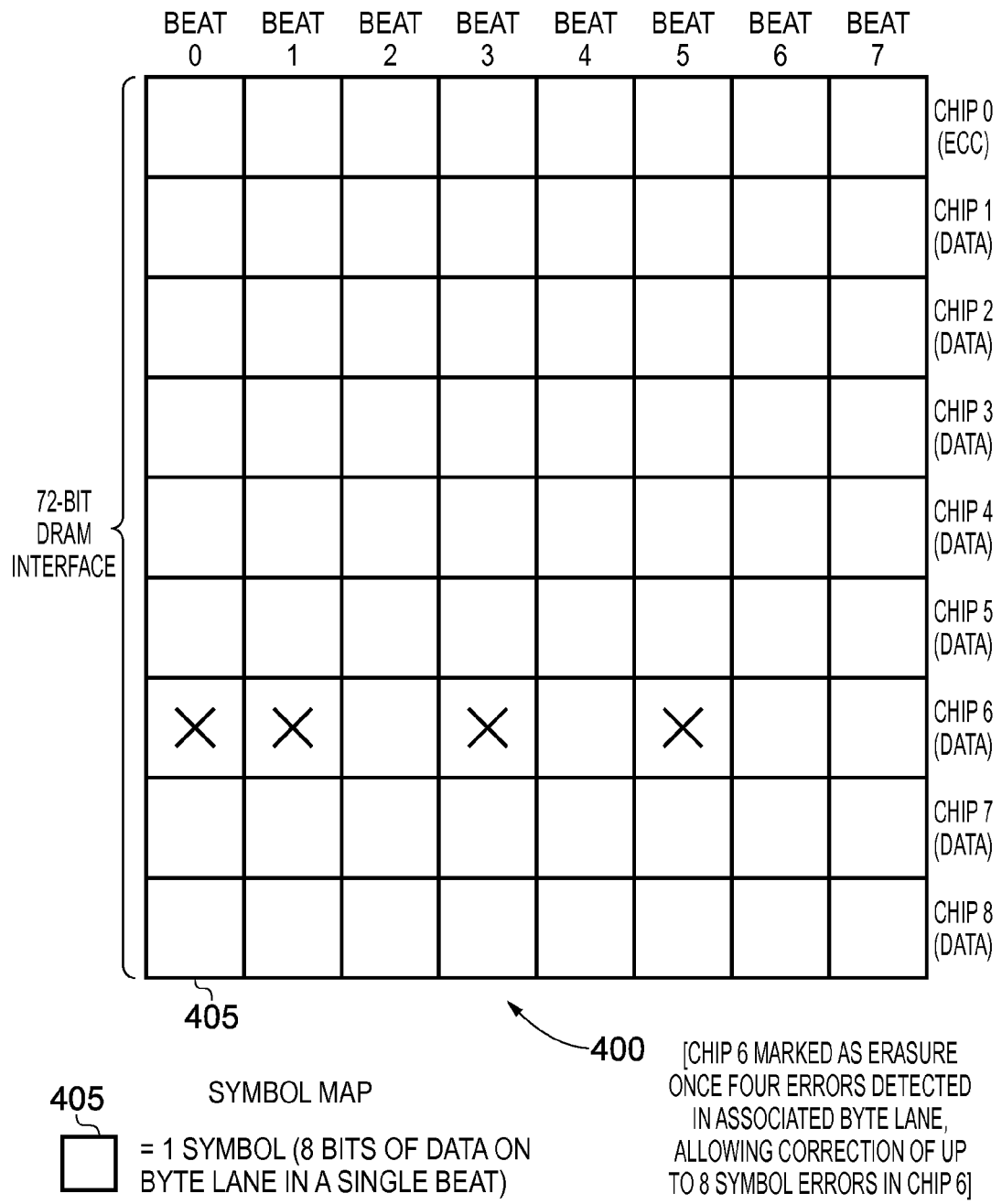
FIG. 5B illustrates an example of an error threshold condition which may cause the error location tracker of FIG. 1 to set one of the chips as an erasure memory region in accordance with that embodiment.

FIG. 5B illustrates an example situation which may give rise to the error threshold condition being reached. In this example, it is assumed that four errors have been located (i.e. the maximum number that can be located and corrected assuming a random distribution of symbol errors). However, in this example, all four of those errors are within the same chip, namely chip 6 (the letter X being used to denote a symbol containing an error). In one embodiment, on detecting the presence of four errors within the byte lane associated with chip 6, the error location tracker 85 sets chip 6 as the erasure memory region. Thereafter, during a subsequent read operation, the error correction circuitry will treat all eight of the symbols within chip 6 as being in error, and since those locations will all be known, it will then be able to correct all eight symbols. In this embodiment, as soon as one of the chips has been set as the erasure memory region, q=8 and p=0. Accordingly, whilst all eight of the symbols within chip 6 can be corrected, no other randomly distributed errors can be tolerated.

Such an approach can be very useful, since it has been found that in DIMMs it is often the case that one of the chips begins to fail before the other chips, and accordingly it is considered likely that the errors will accumulate within a single chip. The above described approach enables the system to continue to correct errors in a failing chip, thereby allowing time for an engineer to be called in order to replace that chip, and then clear the erasure memory condition.

Figure 6A:
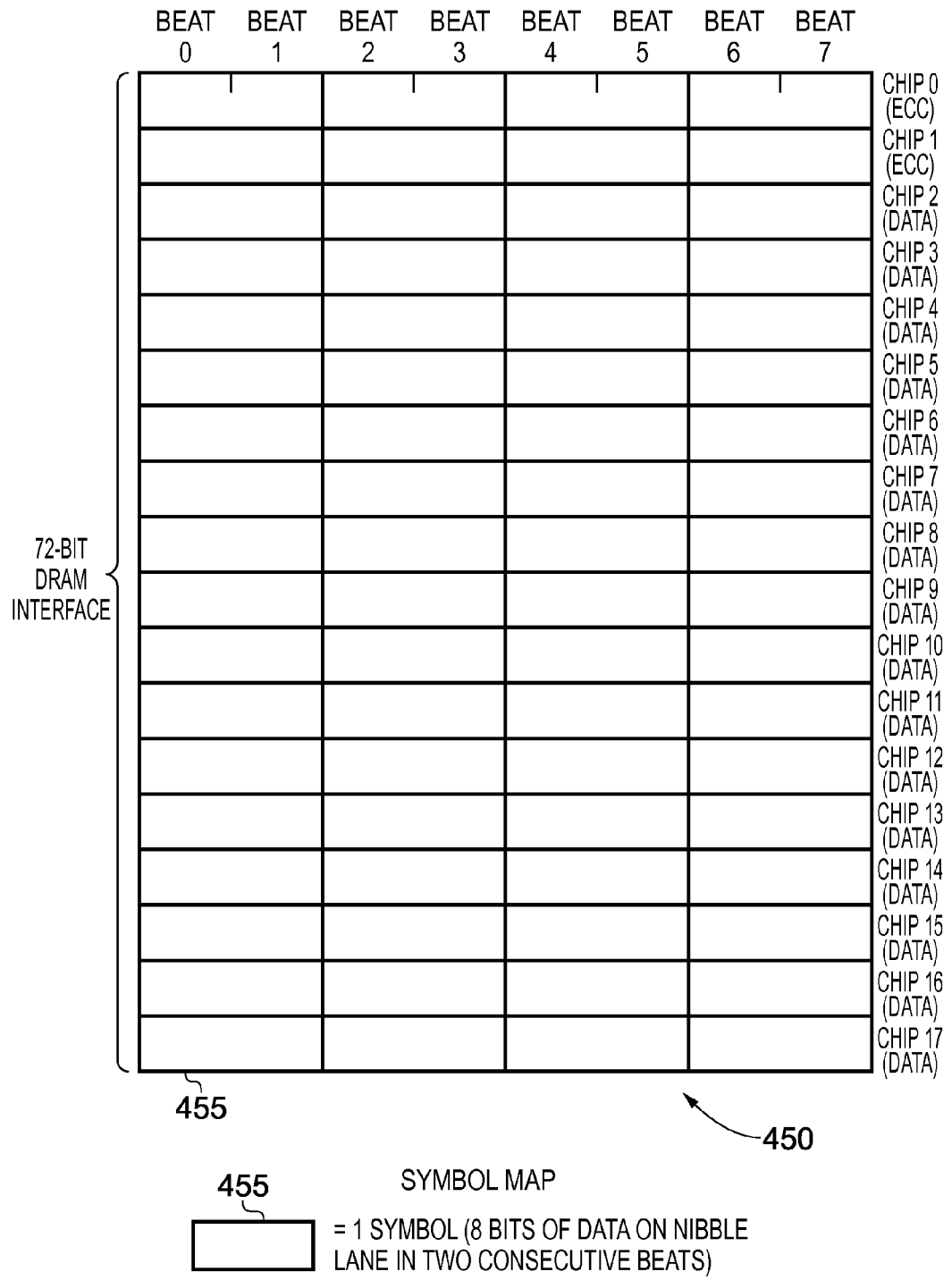
FIG. 6A illustrates a symbol map in accordance with an alternative embodiment.

FIG. 6A illustrates an alternative symbol map 450 where eighteen 4-bit DRAM chips are provided to store the data and ECC codes, and again accesses are performed using bursts of eight beats. In this embodiment, chips 0 and 1 are both used to store ECC codes, whilst the remaining chips are used to store data. Since the chips are 4-bit DRAM chips, the DIMM still provides a 72-bit DRAM interface, and accordingly 72-bits of data and ECC codes are accessed during each beat. In this example, a symbol is still considered to comprise eight bits, and in particular each read symbol is formed from two nibbles output over the same nibble lane in consecutive beats. Accordingly, each rectangular block 455 denotes one symbol. As with the example of FIG. 5A, it will be seen that over the course of the eight beats of a burst read operation, eight symbols are received. As will now be described with reference to FIGS. 6B and 6C, such an approach enables up to two failing chips to be accommodated.

Figure 6B:
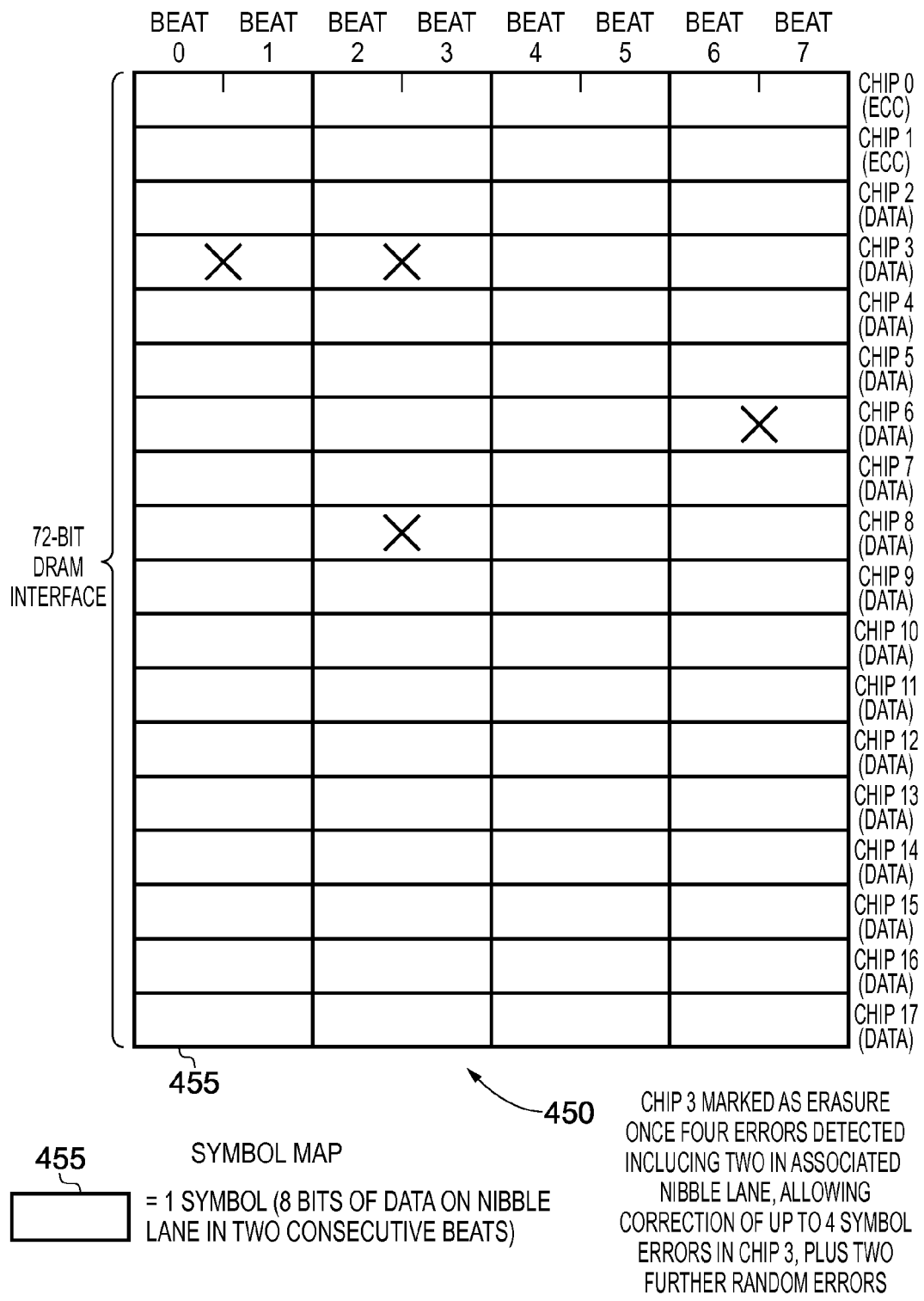
FIG. 6B illustrates an example of an error threshold condition which may cause one of the chips to be set as an erasure memory region.

In particular, considering FIG. 6B, this illustrates a scenario where four symbols have been found to contain errors, this being the maximum number of randomly distributed error symbols that can be tolerated. However, it is also noted that two of the errors reside within a single chip, namely chip 3. In one embodiment, detection of such a pattern of errors by the error location tracker 85 can be used to determine the presence of the erasure condition, causing chip 3 to be set as the erasure memory region. Thereafter, during a subsequent read operation, all four of the symbols associated with chip 3 will be assumed to be in error. Having regards to the earlier-mentioned equation m=2p+q, it will be seen that q is hence 4, and p is 2, given the eight ECC symbols. As a result, errors in up to all four of the symbols in chip 3 can be corrected, whilst still enabling two randomly located symbol errors to be corrected.

Figure 6C:
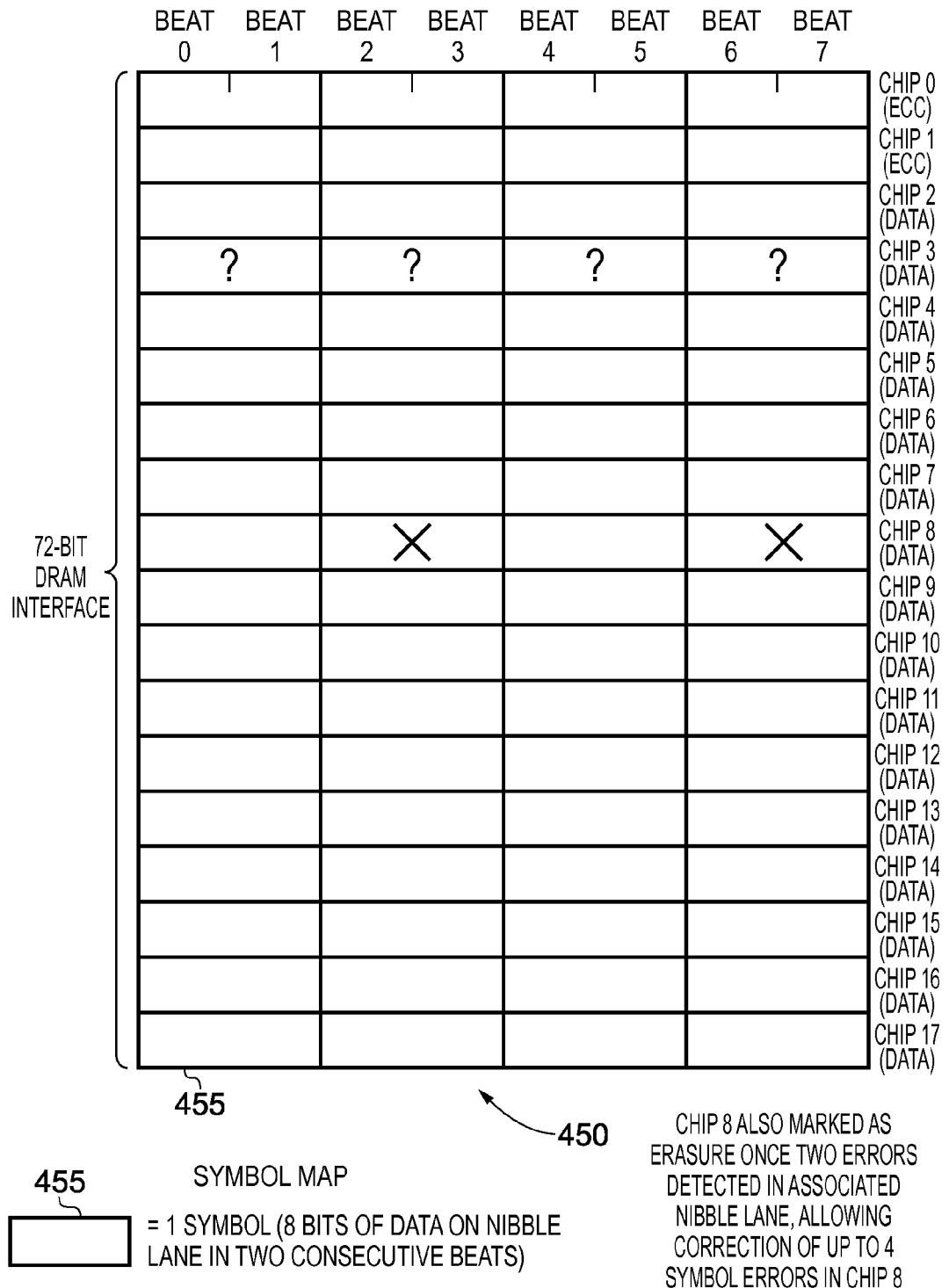
FIG. 6C illustrates an example of a further error threshold condition which may cause a second of the chips to also be marked as forming the erasure memory region, in accordance with that alternative embodiment.

Considering now FIG. 6C, this indicates a pattern of errors that may cause a second chip to be added to the erasure memory region. Question mark symbols are used in association with the symbols of chip 3, since at this point it does not matter whether the symbols of chip 3 are actually producing errors or not, since by virtue of chip 3 having been set at the erasure memory region, each of those symbols is treated as being in error in any event. In addition to the four symbols of chip 3, two further errors have been located, and it is determined that both of those errors reside within chip 8. At this point, the error location tracker 85 may additionally set chip 8 as being within the erasure memory region such that for a subsequent read operation, all four of the symbols in chip 3 and all four of the symbols in chip 8 will be assumed to be in error. Considering the earlier equation m=2p+q, q will now equal 8, and p will be 0. As a result, all eight of the symbols within chip 3 and chip 8 can be corrected, but no other randomly distributed symbol errors can be tolerated.

As with the earlier discussed approach of FIGS. 5A and 5B, such an approach can be very useful within a DIMM, since it is often the case that individual chips fail, and this approach enables up to two of those chips to fail whilst still being able to correct errors in those failed chips, allowing time for an engineer to replace those chips and clear the erasure condition.

Whilst in the above examples of FIGS. 5 and 6 it is assumed that the erasure memory region is set as soon as the described pattern of errors are determined, in an alternative embodiment the error location tracker 85 may keep a history of detected error locations, and not immediately set the erasure memory region as soon as a qualifying pattern is detected. For example, considering FIG. 6B, the error location tracker 85 may not set the erasure memory region as soon as that pattern is first detected, but if over a number of read accesses it is seen that four errors are regularly detected, and that at least two of them are often found within chip 3, it may then decide to set chip 3 as the erasure memory region.

In one embodiment, once the erasure memory region has been set, it is maintained set until it is cleared down by an engineer (for example on replacement of the offending chip). However, a further option is for the error location tracker 85 to continue to maintain a log of error locations, and if over a number of read operations it is found that the number of errors is not increasing within a particular chip marked as the erasure memory region, or in fact is decreasing, this may be used to determine that it is appropriate to clear that chip as an erasure memory region. It is possible for instance, again considering the example of FIG. 6B, that the two symbol errors identified in chip 3 turn out to be transient errors, and are not indicative of chip 3 beginning to fail. If that were the case, then having set chip 3 as the erasure memory region, it will be expected to be observed that the total number of symbol errors within chip 3 does not increase, and indeed may even decrease.

The above described embodiments provide significantly improved operability in memory devices where errors tend to build up within particular memory regions. In particular, in accordance with the described embodiments, when the limit of correction has been reached (based on an assumption of randomly located symbols in error), but where it is detected that a certain number of the symbols in error reside within a common data lane (associated with a particular memory region), then that memory region is treated as having already failed, and accordingly is set as an erasure memory region. This extends the correction capability of the error correction circuitry, and hence allows the system to continue to operate as the memory region degrades towards a total failure of that memory region. In the particular embodiment of a DIMM comprising multiple DRAM chips, this improves tolerance to total chip failure for a given number of ECC symbols.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An apparatus comprising:
a memory device comprising multiple memory regions, and configured to store data symbols and associated error correction code (ECC) symbols;
read circuitry configured to perform a read operation in order to output a plurality of read symbols from said memory device, said read symbols comprising n data symbols and an associated m error correction code symbols, and comprising more than one read symbol from each memory region, both n and m being integer values greater than 1;
a syndrome decoder configured to determine syndrome information from the n data symbols and associated m error correction code symbols;
error correction circuitry configured to be responsive to said syndrome information indicating that an error exists in at least one read symbol, to perform an error correction process to seek to locate each read symbol containing an error and to correct the errors in each of those located read symbols, if the read symbols containing an error are randomly distributed amongst the plurality of read symbols, the error correction circuitry being configured to locate and correct those errors using the error correction process if no more than PMAX read symbols of said plurality of read symbols contain errors, where PMAX is equal to a maximum number of errors that can be located and corrected; and
error tracking circuitry configured to track which memory regions the located read symbols containing an error originate from, and on detecting an error threshold condition being reached, to set at least one memory region from said multiple memory regions as an erasure memory region;
the error correction circuitry being responsive to the erasure memory region being set by the error tracking circuitry, to treat each read symbol from said erasure memory region as a located read symbol containing an error, such that when the error correction process is performed the read symbols to be located are not all randomly distributed and the error correction circuitry is configured to locate and correct the errors if no more than x read symbols of said plurality of read symbols contain errors, where x is greater than PMAX.

2. An apparatus as claimed in claim 1, wherein:
if the total number of read symbols from said erasure memory region is q, then the error correction circuitry is configured to correct errors in all q read symbols from said erasure memory region and in addition to correct errors in up to p read symbols from any memory regions not set as said erasure memory region, where:

$p=(m-q)/2$, where m is greater than or equal to q, and p and q are integer values greater than or equal to 0.

3. An apparatus as claimed in claim 1, wherein PMAX is equal to m/2.

4. An apparatus as claimed in claim 1, wherein the maximum value of x (QMAX) is m.

5. An apparatus as claimed in claim 3, wherein:
the plurality of read symbols output by the read circuitry during said read operation comprise more than PMAX read symbols from each memory region.

6. An apparatus as claimed in claim 1, wherein said read operation is a burst read operation comprising multiple beats, and each memory region is accessed during every beat.

7. An apparatus as claimed in claim 6, wherein there are at least as many error correction code symbols in said plurality of read symbols as there are beats in the burst read operation.

8. An apparatus as claimed in claim 7, wherein there are m beats in said burst read operation.

9. An apparatus as claimed in claim 1, wherein said memory device comprises a plurality of memory chips, each memory chip forming one of said memory regions.

10. An apparatus as claimed in claim 9, wherein:
said memory device comprises a dual inline memory module (DIMM);
each memory chip has an associated data lane; and
said read operation is a burst read operation comprising multiple beats, during each beat at least one data unit being read from each memory chip via its associated data lane.

11. An apparatus as claimed in claim 10, wherein said data unit is one of a byte and a nibble.

12. An apparatus as claimed in claim 11, wherein during each beat a byte is output from each memory chip, and each read symbol comprises one of said bytes.

13. An apparatus as claimed in claim 11, wherein during each beat a nibble is output from each memory chip, and each read symbol is formed from two nibbles output over the same data lane in consecutive beats.

14. An apparatus as claimed in claim 1, wherein said read symbols form a Reed Solomon code word.

15. An apparatus as claimed in claim 1, wherein the error tracking circuitry is configured to determine whether said error threshold condition is detected based on at least an indication of which memory regions the located read symbols containing an error originate from for a current read operation.

16. An apparatus as claimed in claim 15, wherein the error tracking circuitry is configured to maintain a history of which memory regions the located read symbols containing an error originate from for a number of previous read operations and to also reference said history when determining whether said error threshold condition is detected.

17. An apparatus as claimed in claim 1, wherein once the erasure memory region has been set, the error tracking circuitry is configured to maintain the set erasure memory region until a reset operation is performed.

18. An apparatus as claimed in claim 1, wherein the error correction process performed by the error correction circuitry comprises:
a) seeking to solve an error location polynomial using said syndrome information as an input;
b) if the error location polynomial is solved at said step (a), identifying each read symbol containing an error by determining roots of the solved error location polynomial; and
c) using the roots and the syndrome information to determine the corrected values for the read symbols identified at said step (b).

19. An apparatus as claimed in claim 18, wherein the error location polynomial has a plurality of parameters which can be varied during said step (a) when seeking to solve the error location polynomial, and if the erasure memory region is set, the error correction circuitry is configured to fix values for at least a subset of the plurality of parameters, the fixed values being dependent on the at least one memory region set as the erasure memory region.

20. A method of correcting errors in data accessed from a memory device comprising multiple memory regions and configured to store data symbols and associated error correction code (ECC) symbols, the method comprising:
performing a read operation in order to output a plurality of read symbols from said memory device, said read symbols comprising n data symbols and an associated m error correction code symbols, and comprising more than one read symbol from each memory region, both n and m being integer values greater than 1;
determining syndrome information from the n data symbols and associated m error correction code symbols;
responsive to said syndrome information indicating that an error exists in at least one read symbol, performing an error correction process to seek to locate each read symbol containing an error and to correct the errors in each of those located read symbols, if the read symbols containing an error are randomly distributed amongst the plurality of read symbols, the error correction process locating and correcting those errors if no more than PMAX read symbols of said plurality of read symbols contain errors, where PMAX is equal to a maximum number of errors that can be located and corrected;
tracking which memory regions the located read symbols containing an error originate from, and on detecting an error threshold condition being reached, setting at least one memory region from said multiple memory regions as an erasure memory region; and
responsive to the erasure memory region being set by the error tracking circuitry, treating each read symbol from said erasure memory region as a located read symbol containing an error, such that when the error correction process is subsequently performed the read symbols to be located are not all randomly distributed and the error correction process locates and corrects the errors if no more than x read symbols of said plurality of read symbols contain errors, where x is greater than PMAX.

21. An apparatus comprising:
memory means for storing data symbols and associated error correction code (ECC) symbols, the memory means comprising multiple memory regions;
read means for performing a read operation in order to output a plurality of read symbols from said memory means, said read symbols comprising n data symbols and an associated m error correction code symbols, and comprising more than one read symbol from each memory region, both n and m being integer values greater than 1;
a syndrome decoder means for determining syndrome information from the n data symbols and associated m error correction code symbols;
error correction means, responsive to said syndrome information indicating that an error exists in at least one read symbol, for performing an error correction process to seek to locate each read symbol containing an error and to correct the errors in each of those located read symbols, if the read symbols containing an error are randomly distributed amongst the plurality of read symbols, the error correction means locating and correcting those errors using the error correction process if no more than PMAX read symbols of said plurality of read symbols contain errors, where PMAX is equal to a maximum number of errors that can be located and corrected; and error tracking means for tracking which memory regions the located read symbols containing an error originate from, and on detecting an error threshold condition being reached, for setting at least one memory region from said multiple memory regions as an erasure memory region;

the error correction means, responsive to the erasure memory region being set by the error tracking means, for treating each read symbol from said erasure memory region as a located read symbol containing an error, such that when the error correction process is performed the read symbols to be located are not all randomly distributed and the error correction means locates and corrects the errors if no more than x read symbols of said plurality of read symbols contain errors, where x is greater than PMAX.

* * * * *